(12) United States Patent
Ulatoski et al.

(10) Patent No.: US 12,705,039 B2
(45) **Date of Patent: *Aug. 11, 2026**

(54) ON-DEMAND REMOTE APPLICATIONS

(71) Applicant: Omnissa, LLC, Palo Alto, CA (US)

(72) Inventors: Jeffrey Paul Ulatoski, Palo Alto, CA (US); Jairam Choudhary, Palo Alto, CA (US)

(73) Assignee: Omnissa, LLC, Mountain View, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/821,980

(22) Filed: Aug. 30, 2024

(65) Prior Publication Data

US 2024/0419422 A1 Dec. 19, 2024

Related U.S. Application Data

(63) Continuation of application No. 17/727,503, filed on Apr. 22, 2022, now Pat. No. 12,079,609.

(51) Int. Cl.

| | |
|---|---|
| ***G06F 8/61*** | (2018.01) |
| ***G06F 9/445*** | (2018.01) |
| ***H04L 67/00*** | (2022.01) |
| ***H04L 67/1004*** | (2022.01) |

(52) U.S. Cl.

CPC ................ *G06F 8/61* (2013.01); *G06F 9/445* (2013.01); *H04L 67/34* (2013.01); *H04L 67/1004* (2013.01)

(58) Field of Classification Search

CPC ... G06F 8/61; G06F 9/445; G06F 8/60; G06F 9/452; H04L 67/34; H04L 67/1004

See application file for complete search history.

(56) References Cited

U.S. PATENT DOCUMENTS

| | | | | |
|---|---|---|---|---|
| 10,452,868 | B1 | 10/2019 | Sundberg et al. | |
| 10,887,390 | B1 * | 1/2021 | Kutuzov | H04L 67/34 |
| 2008/0133777 | A1 * | 6/2008 | Wilkinson | H04L 67/63 709/230 |
| 2011/0276661 | A1 * | 11/2011 | Gujarathi | G06F 9/452 709/219 |
| 2012/0096365 | A1 * | 4/2012 | Wilkinson | G06F 9/468 715/740 |
| 2013/0073703 | A1 * | 3/2013 | Das | H04L 67/14 709/223 |

(Continued)

OTHER PUBLICATIONS

"VMware Horizon", VMware Inc., Palo Alto, CA, downloaded from https://www.vmware.com/in/products/horizon.html on Apr. 22, 2022.

(Continued)

*Primary Examiner* — Javier O Guzman

(74) *Attorney, Agent, or Firm* — Kim & Stewart LLP

(57) ABSTRACT

Techniques for delivering remote applications to servers in an on-demand fashion (i.e., as end-users need them) are provided. In one set of embodiments, these techniques include packaging the installed contents (e.g., executable code and configuration data) of the remote applications into containers, referred to as application packages, that are placed on shared storage and dynamically attaching (i.e., mounting) an application package to a server at a time an end-user requests access a remote application in that package, thereby enabling the server to launch the application.

20 Claims, 4 Drawing Sheets

(56) References Cited

U.S. PATENT DOCUMENTS

| | | | | |
|---|---|---|---|---|
| 2015/0019705 | A1* | 1/2015 | Suryanarayanan | G06F 9/452 709/224 |
| 2015/0334162 | A1* | 11/2015 | Krishnamurthy | G06F 3/0485 715/740 |
| 2016/0132310 | A1* | 5/2016 | Koushik | G06F 8/61 717/176 |
| 2018/0060572 | A1 | 3/2018 | Singleton et al. | |
| 2020/0250372 | A1* | 8/2020 | Remington | G06F 21/6281 |
| 2020/0364072 | A1 | 11/2020 | Jayraman | |
| 2020/0389543 | A1* | 12/2020 | Swope | H04L 67/34 |
| 2021/0165948 | A1* | 6/2021 | Hinchliffe | G06F 40/103 |

OTHER PUBLICATIONS

"App Volumes", VMware Inc., Palo Alto, CA, downloaded from https://www.vmware.com/in/products/appvolumes.html on Apr. 22, 2022.

"ThinApp", VMware Inc., downloaded from https://www.vmware.com/in/products/thinapp.html on Apr. 22, 2022.

"MSIX", VMware Inc., Palo Alto, CA, downloaded from https://www.vmware.com/in/products/thinapp.html on Apr. 22, eo22.

"VHD", VMware Inc., Palo Alto, CA, downloaded from https://docs.microsoft.com/en-us/windows-server/storage/disk-management/manage-virtual-hard-disks on Apr. 22, 2022.

Azure Virtual Desktop (AVD), Microsoft Corp., Redmond, WA, downloaded from https://azure.microsoft.com/en-in/services/virtual-desktop/ on Apr. 22, 2022.

"Remote Desktop Session Host (ROSH)", VMware Inc., Palo Alto, CA, downloaded from https://searchvirtualdesktop.echtarget.com/definition/Remote-Desktop-Session-Host-RDSH on Apr. 22, 2022.

International Search Report and Written Opinion, International Searching Authority, Application No. PCT/US2023/016782, Jun. 30, 2023.

* cited by examiner

ON-DEMAND REMOTE APPLICATIONS

CROSS-REFERENCE

This application is a continuation of U.S. patent application Ser. No. 17/727,503, filed Apr. 22, 2022, and issued as U.S. Pat. No. 12,079,609 on Sep. 3, 2024, which application is incorporated by reference herein in its entirety.

BACKGROUND

Unless otherwise indicated, the subject matter described in this section is not prior art to the claims of the present application and is not admitted as being prior art by inclusion in this section.

App remoting is a technology that enables software applications running on a central server to be streamed to, and thus used/controlled from, remote (i.e., client) devices operated by end-users. These software applications are known as remote applications. Existing solutions for deploying remote applications in an enterprise or other similar setting generally involve (1) defining multiple groups of servers, referred to as server farms, where each server farm is associated with a user group in the enterprise with a distinct set of application requirements, (2) creating a master software image for each server farm that includes installations of the specific remote applications relevant to the server farm's user group, and (3) deploying the server farms with their respective master software images. However, this approach results in several challenges and administrative pain points pertaining to server, image, and application management.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for delivering remote applications to servers in an on-demand fashion (i.e., as end-users need them). In one set of embodiments, these techniques include packaging the installed contents (e.g., executable code and configuration data) of the remote applications into containers, referred to as application packages, that are placed on shared storage and dynamically attaching (i.e., mounting) an application package to a server at a time an end-user requests access a remote application in that package, thereby enabling the server to launch the application.

With on-demand delivery, the installed contents of remote applications can be entirely decoupled from—or in other words, stored and maintained independently of—the master software images loaded on the servers hosting those applications. This, in turn, simplifies server/image/application management and leads to other benefits such as the elimination of downtime for remote application upgrades. The foregoing and other aspects are described in further detail below.

2. Typical App Remoting Environment

Figure 1:
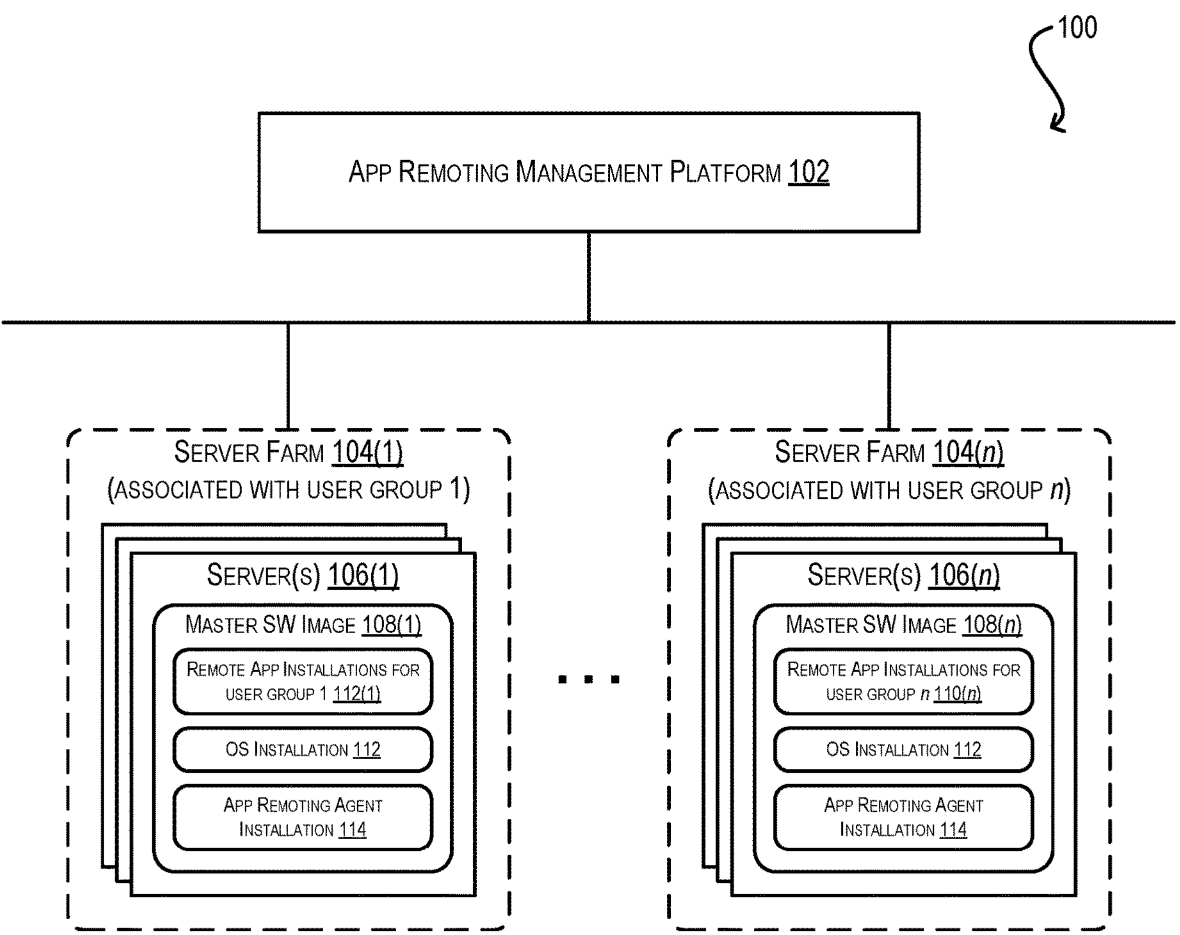
FIG. 1 depicts a typical app remoting environment.

To provide context for the embodiments of the present disclosure, FIG. 1 depicts a typical app remoting environment 100 that may be implemented by an enterprise or other similar entity/organization. As shown, app remoting environment 100 includes an app remoting management platform 102 that is communicatively coupled with a number of server farms 104(1)-(*n*). App remoting management platform 102 is a software platform that allows administrators to install, organize, and manage the lifecycles of remote applications within app remoting environment 100. In one set of embodiments, app remoting management platform 102 may run on machines in a public cloud such as Microsoft Azure or Amazon AWS. In other embodiments, app remoting management platform 102 may run on machines in a private cloud or one or more on-premises data centers.

Server farms 104(1)-(*n*) are composed of groups of servers 106(1)-(*n*) that are configured to execute the remote applications installed and managed via app remoting management platform 102. Like the underlying hardware of platform 102, server farms 104(1)-(*n*) may be part of a public cloud, a private cloud, or one or more on-premises data centers. In certain embodiments, servers 106(1)-(*n*) may be multi-session servers (e.g., Remote Desktop Session (RDS) hosts or Windows 10 multi-session machines) that are capable of hosting multiple concurrent user sessions for remote application users. A "user session" or "session" is a temporal context (typically starting at the time of user login and ending at the time of user logout) within which an end-user can launch and interact with a computing desktop and applications.

As indicated in FIG. 1, each server farm 104(*i*) for i=1, . . . , n is associated with a corresponding user group i and the servers 106(*i*) of server farm 104(*i*) are loaded with a master software image 108(*i*) that includes installations of the specific remote applications 110(*i*) needed by or relevant to that user group (in addition to installations of an operating system (OS) 112 and an app remoting agent 114 for enabling remote application access). For example, server farm 104(1) may be associated with a development organization and thus its servers 106(1) may be loaded with a master software image 108(1) comprising installations of software development tools (e.g., compilers, source code editors, debuggers, etc.). As another example, server farm 104(2) may be associated with a finance department thus its servers 106(2) may be loaded with a master software image 108(2) comprising installations of financial applications (e.g., accounting, invoice management, etc.). This allows app remoting environment 100 to serve each user group of the enterprise via its corresponding server farm and unique master software image.

For instance, if an end-user in a user group j requests access to a remote application needed by that user group, app remoting management platform 102 can redirect the end-user's client device to one of the servers 106(*j*) in server farm 104(*j*) because those servers will have the requested application installed via master software image 108(*j*). The app remoting agent running on the selected target server within server farm 104(*j*) can then launch and stream the remote application to the end-user's client device.

Unfortunately, while app remoting environment 100 is functional and successfully accommodates the disparate application requirements of different user groups, it is also problematic for several reasons. For example, the administrators of app remoting environment 100 must correctly estimate the appropriate size of each server farm (e.g., server count and capacity) based on projected application usage patterns across user groups to avoid server overloading and/or underutilization. Further, if the enterprise is large, the administrators will need to create and manage a large number of server farms and corresponding master software images (potentially on the order of hundreds or more), which is burdensome and time-consuming. Yet further, to upgrade a remote application in a given server farm, all of the active user sessions in that farm must be terminated or drained to backup servers because the server farm's master software image, which includes both its OS and applications, must be rebuilt and reloaded. This undesirably results in downtime for all of the farm's users or delays in rolling out new application versions.

3. Solution Architecture and High-Level Workflow

Figure 2:
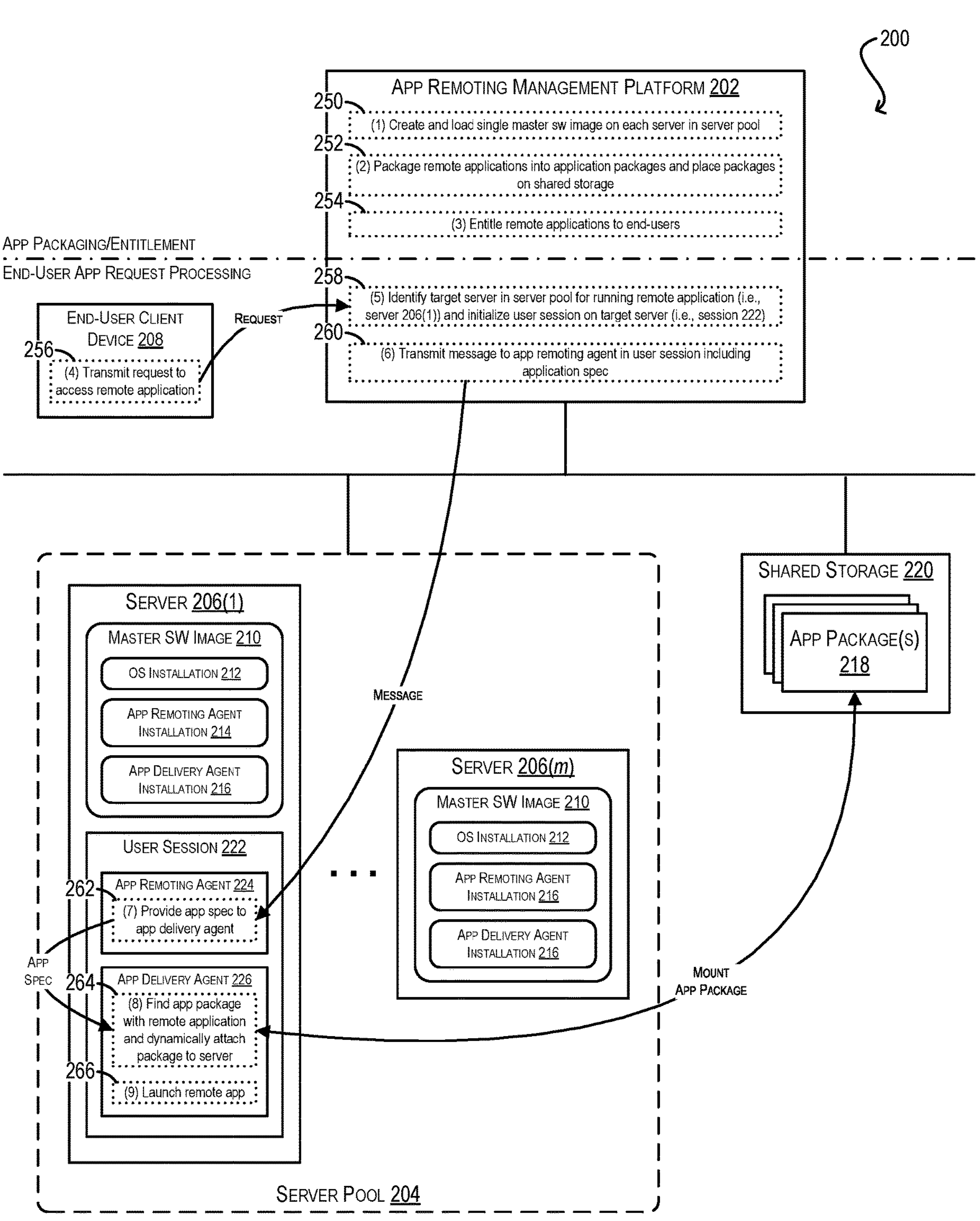
FIG. 2 depicts an app remoting environment that supports on-demand delivery of remote applications according to certain embodiments.

To address the foregoing and other similar issues, FIG. 2 depicts a novel app remoting environment 200 according to embodiments of the present disclosure that allows remote applications to be (1) decoupled from the master software images loaded on the servers running the applications, and (2) delivered on-demand to any server in response to end-user access requests As shown, app remoting environment 200 includes, among other things, an enhanced app remoting management platform 202 and a singular server pool 204 comprising servers 206(1)-(*m*) (in lieu of the multiple server farms 104(1)-(*n*) of FIG. 1). Each server 206 in server pool 204 can be a physical or virtual machine that runs a multi-session service or OS. In addition, FIG. 2 depicts a high-level workflow comprising steps (1)-(9) (reference numerals 250-266) that can be executed by enhanced app remoting management platform 202 and servers 206(1)-(*m*) for deploying remote applications within environment 200 and processing a request from an end-user client device 208 for accessing (i.e., launching and interacting with) a remote application.

Starting with step (1) (reference numeral 250), enhanced app remoting management platform 202 can, under the direction of one or more administrators, create and load a single master software image 210 on each server 206(*i*) for i=1, . . . m. This single master software image can include the installation of an OS 212, an app remoting agent 214, and an app delivery agent 216 (discussed below).

At step (2) (reference numeral 252), enhanced app remoting management platform 202 can, under the direction of the administrator(s), package the remote applications for environment 200 into one or more application packages 218 and can place/store the application packages on shared storage 220 (comprising, e.g., one or more networked storage servers or arrays) that is accessible to servers 206(1)-(*m*). In certain embodiments, each application package can include a virtual disk file (e.g., a VMDK or VHD file) and a metadata file (e.g., a JavaScript Object Notation (JSON) file). The virtual disk file can hold the installed content (e.g., executable program code/files and configuration data such as OS registry entries) of the remote applications packaged therein, and the metadata file can hold metadata attributes for those applications (e.g., application name, vendor, version, executable path, application identifier (ID), entry points, etc.).

Once the remote applications have been packaged and placed on shared storage 220 in the form of application packages 218, enhanced app remoting platform 202 can, under the direction of the administrator(s), assign (or in other words, entitle) those remote applications to end-users/user groups of app remoting environment 200 (step (3); reference numeral 254). Through this entitlement process, the administrators can enable each end-user to view and launch their set of entitled remoted applications from their client device(s).

Turning now to end-user request processing, an end-user can login to client software running on end-user client device 208 in order to access the remote applications entitled to that end-user. Upon launching a given remote application via the client software, end-user client device 208 can transmit a request to enhanced app remoting management platform 202 to access that remote application. In response, enhanced app remoting management platform 202 can identify a target server in server pool 204 for running the remote application (e.g., server 206(1) in FIG. 1) and can initialize a user session 222 for the end-user on target server 206(1) (step (5); reference numeral 258).

Enhanced app remoting management platform 202 can then transmit a message to an instance of the app remoting agent running within user session 222 (i.e., app remoting agent 224) that includes an application specification for the remote application (step (6); reference numeral 260). This application specification can include, among other things, information usable by target server 206(1) for finding the application package that includes the remote application (e.g., application package ID) and for launching the application (e.g., executable path).

At step (7) (reference numeral 262), app remoting agent 224 can receive the message and provide the application specification to the app delivery agent running within user session 222 (i.e., app delivery agent 226). In response, app delivery agent 226 can find the application package on shared storage 220 that includes the remote application, dynamically attach (or in other words, mount) the application package from shared storage 220 to target server 206(1), and launch the remote application within user session 222 (steps (8) and (9); reference numerals 264 and 266).

Finally, although not shown, app remoting agent 224 can receive an acknowledgement from app delivery agent 226 that the remote application has been successfully launched and can thereafter project/stream the user interface of the launched remote application to end-user client device 208 via an appropriate remote display protocol (e.g., Blast Extreme or PC over IP (PCOIP)), thereby enabling the end-user to remotely interact with and use the application from client device 208.

With the architecture and high-level workflow depicted in FIG. 2, a number of advantages are realized. First, because application packages 218—which include the installed contents of the remote applications of environment 200—are maintained on shared storage 220, those remote applications are effectively decoupled from the master software images loaded on the servers configured to run them, unlike environment 100 of FIG. 1. This eliminates the need to create separate server farms, each with a distinct software image comprising the specific remote applications required by the end-users of that farm. Instead, the administrators of environment 200 can simply create a single, "global" server pool (i.e., server pool 204) applicable to all end-users and a single master software image (i.e., image 210) that is loaded on every server of the pool. As a result, the administrators no longer need to perform complicated per-farm capacity planning (resulting in better overall server utilization/load balancing) and no longer need to manage the lifecycles of multiple server farms and multiple master software images (thereby significantly reducing administrative overhead).

Second, at the time of upgrading or patching a remote application, the administrators can update the installed content of the application within its application package on shared storage 220, without touching master software image 210. This means that servers 206(1)-(*m*) can remain online throughout the upgrade process, thus avoiding disruption to end-users and eliminating the cost and effort of maintaining backup servers for user overflow/draining purposes.

The remaining sections of the present disclosure provide additional details for implementing the high-level workflow of FIG. 2 according to various embodiments. It should be appreciated that FIG. 2 is illustrative and not intended to limit any embodiments disclosed herein. For example, the various entities shown in this figure may be organized according to different arrangements/configurations or may include subcomponents or functions that are not specifically described. One of ordinary skill in the art will recognize other variations, modifications, and alternatives.

4. Application Packaging and Entitlement

Figure 3:
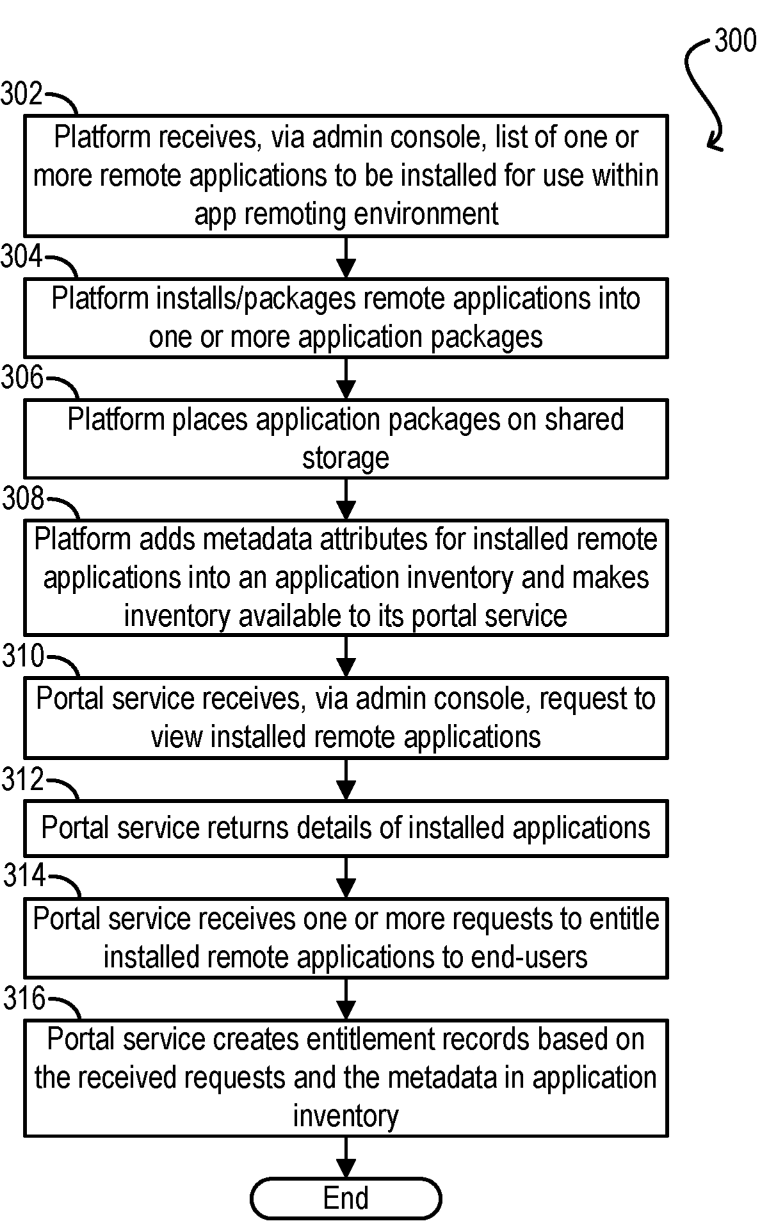
FIG. 3 depicts a flowchart for packaging and entitling remote applications according to certain embodiments.

FIG. 3 depicts a flowchart 300 that details the processing that may be performed by enhanced app remoting management platform 202 for installing/packaging remote applications into application packages and entitling the applications to end-users (per steps (3)-(5) of the high-level workflow of FIG. 2) according to certain embodiments. Flowchart 300 assumes that enhanced app remoting management platform 202 includes an administrative console usable by the administrators of app remoting environment 200 for interacting with platform 202, an application inventory configured to hold information regarding installed/packaged remote applications, and a portal service configured to carry out application entitlement and to accept end-user application access requests.

Starting with block 302, enhanced app remoting management platform 202 can receive, via the administrative console, a list of one or more remote applications to be installed for use within environment 200. In response, enhanced app remoting management platform 202 can install/package the remote applications into one or more application packages (block 304) and place the application packages on shared storage 220 (block 306). As mentioned previously, each application package can include a virtual disk file that holds the contents of the remote applications installed therein and a metadata file that holds metadata attributes of the installed applications (e.g., application package ID, application name, application ID, application executable path, application entry points, etc.). In one set of embodiments, enhanced app remoting management platform 202 can install/package each remote application into its own application package. In other embodiments, enhanced app remoting management platform 202 may group multiple remote applications into a single application package based on one or more criteria (e.g., application type, vendor, etc.).

At block 308, enhanced app remoting management platform 202 can add the metadata attributes for each remote application installed per block 306 into its application inventory and can make this inventory available to the portal service.

The portal service can then receive, via the administrative console, a request to view the installed remote applications for entitlement purposes (block 310) and can return the details of the installed applications (block 312).

At block 314, the portal service can receive one or more requests to entitle the remote applications returned at block 312 to end-users. Finally, at block 316, portal service can create entitlement records based on the received entitlement requests and the metadata maintained in the application inventory. For example, in response to receiving a request to entitle a remote application A to an end-user U, the portal service can create an entitlement record that includes the ID/name of user U, the ID/name of application A, and other metadata pertaining to A (e.g., A's application package ID, executable path, etc.).

5. End-User Application Request Processing

Figure 4:
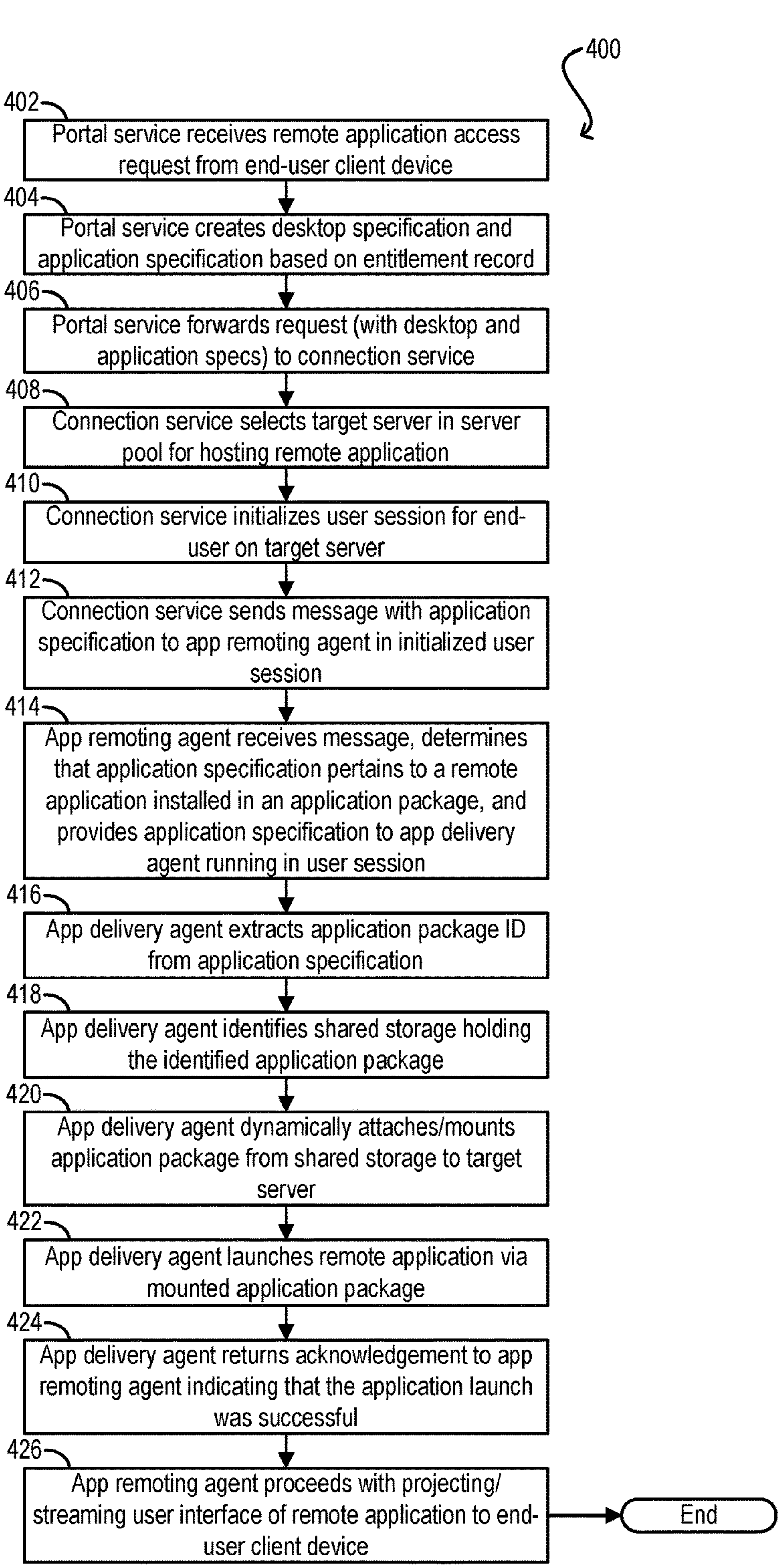
FIG. 4 depicts a flowchart for processing a remote application access request according to certain embodiments.

FIG. 4 depicts a flowchart 400 that details the processing that may be performed by enhanced app remoting management platform 202 and target server 206(1) of server pool 204 for handling an application access request sent by end-user client device 208 (per steps (6)-(11) of the high-level workflow of FIG. 2) according to certain embodiments. Flowchart 400 assumes that an entitlement record has been created per flowchart 300 of FIG. 3 that entitles the end-user of device 208 to the requested remote application. In addition, flowchart 400 assumes that enhanced app remoting management platform 202 includes a connection service configured to manage the assignment/redirection of end-users to servers in server pool 204.

Starting with blocks 402-406, the portal service of enhanced app remoting management platform 202 can receive the application access request from end-user client device 208, create a desktop specification for the end-user and an application specification for the requested remote application based on the entitlement record, and forward the request (with the desktop and application specifications) to platform 202's connection service. The desktop specification can include information usable for initializing a new user session for the end-user on a server in server pool 204. The application specification can include information usable for identifying the installed location of the remote application (e.g., application package ID) and for launching the application (e.g., executable path).

At block 408, the connection service can select a target server in server pool 204 (i.e., server 206(1)) for hosting the remote application. In certain embodiments, the connection service can perform this selection based on one or more rules/criteria such as server load, availability, features, and so on. The connection service can then initialize a user session for the end-user on target server 206(1) (i.e., user session 222) (block 410) and can transmit a message that includes the application specification to the app remoting agent running within that user session (i.e., app remoting agent 224) (block 412).

At block 414, app remoting agent 224 can receive the message, determine that the application specification included therein pertains to a remote application installed in an application package, and can provide the application specification to the app delivery agent running within user session 222 (i.e., app delivery agent 226).

In response, app delivery agent 226 can extract the application package ID included in the application specification (block 416), identify shared storage 220 as holding that application package (block 418), and can dynamically attach/mount the application package from shared storage 220 to server 206(1) (block 420). As part of block 420, app delivery agent 226 can also virtualize the file system of the remote application such that its installed files and registry entries are visible/accessible within user session 222.

Upon attaching/mounting the application package, app delivery agent 226 can launch the remote application via the mounted application package using the executable path defined in the application specification (block 422) and return an acknowledgement to app remoting agent 224 indicating that the application launch is successful (block 424). Finally, at block 426, app remoting agent 224 can inform end-user client device 208 that the remote application has been launched and can proceed with projecting/streaming the user interface of the application to the client device.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:

in response to receiving a request to access a remote application from a client device, identifying, by a computer system, a target server in a plurality of servers for running the remote application, wherein the remote application is maintained in an application package on a shared storage component separate from the plurality of servers;

initializing, by the computer system, a user session for the client device on the target server, wherein an application remoting agent is launched in the user session on the target server; and transmitting, by the computer system to the application remoting agent on the target server, an application specification for the remote application, the application specification including an identifier of the application package and an executable path for the remote application, wherein the application package is mounted from the shared storage component to the target server based on the application specification in order to launch the remote application on the target server.

2. The method of claim 1, wherein upon receiving the application specification, the application remoting agent provides the application specification to an application delivery agent running in the user session.

3. The method of claim 2, wherein the application delivery agent:

determines, based on the application specification, that the remote application is installed in the application package;

dynamically mounts the application package from the shared storage component to the target server; and launches the remote application from the mounted application package within the user session.

4. The method of claim 3, wherein the application remoting agent streams a user interface of the launched remote application to the client device using a remote display protocol.

5. The method of claim 1, wherein the plurality of servers are loaded with a common software image that includes an operating system, the application remoting agent and an application delivery agent, wherein the common software image does not contain the remote application.

6. The method of claim 1, wherein the application package comprises a virtual disk file that includes installed content of the remote application and metadata attributes of the remote application.

7. The method of claim 1, wherein the computer system identifies the target server based on one or more criteria including current loads on the plurality of servers.

8. A non-transitory computer readable storage medium having stored thereon program code executable by a computer system, the program code embodying a method comprising:

in response to receiving a request to access a remote application from a client device, identifying, by a computer system, a target server in a plurality of servers for running the remote application, wherein the remote application is maintained in an application package on a shared storage component separate from the plurality of servers;

initializing, by the computer system, a user session for the client device on the target server, wherein an application remoting agent is launched in the user session on the target server; and transmitting, by the computer system to the application remoting agent on the target server, an application specification for the remote application, the application specification including an identifier of the application package and an executable path for the remote application, wherein the application package is mounted from the shared storage component to the target server based on the application specification in order to launch the remote application on the target server.

9. The non-transitory computer readable storage medium of claim 8, wherein upon receiving the application specification, the application remoting agent provides the application specification to an application delivery agent running in the user session.

10. The non-transitory computer readable storage medium of claim 9, wherein the application delivery agent:

determines, based on the application specification, that the remote application is installed in the application package;

dynamically mounts the application package from the shared storage component to the target server; and launches the remote application from the mounted application package within the user session.

11. The non-transitory computer readable storage medium of claim 10, wherein the application remoting agent streams a user interface of the launched remote application to the client device using a remote display protocol.

12. The non-transitory computer readable storage medium of claim 8, wherein the plurality of servers are loaded with a common software image that includes an operating system, the application remoting agent and an application delivery agent, wherein the common software image does not contain the remote application.

13. The non-transitory computer readable storage medium of claim 8, wherein the application package comprises a virtual disk file that includes installed content of the remote application and metadata attributes of the remote application.

14. The non-transitory computer readable storage medium of claim 8, wherein the computer system identifies the target server based on one or more criteria including current loads on the plurality of servers.

15. A computer system comprising:

a processor; and a non-transitory computer readable medium having stored thereon program code that, when executed, causes the processor to:

in response to receiving a request to access a remote application from a client device, identify a target server in a plurality of servers for running the remote application, wherein the remote application is maintained in an application package on a shared storage component separate from the plurality of servers;

initialize a user session for the client device on the target server, wherein an application remoting agent is launched in the user session on the target server; and transmit, to the application remoting agent on the target server, an application specification for the remote application, the application specification including an identifier of the application package and an executable path for the remote application, wherein the application package is mounted from the shared storage component to the target server based on the application specification in order to launch the remote application on the target server.

16. The computer system of claim 15, wherein upon receiving the application specification, the application remoting agent provides the application specification to an application delivery agent running in the user session.

17. The computer system of claim 16, wherein the application delivery agent:

determines, based on the application specification, that the remote application is installed in the application package;

dynamically mounts the application package from the shared storage component to the target server; and launches the remote application from the mounted application package within the user session.

18. The computer system of claim 17, wherein the application remoting agent streams a user interface of the launched remote application to the client device using a remote display protocol.

19. The computer system of claim 15, wherein the plurality of servers are loaded with a common software image that includes an operating system, the application remoting agent and an application delivery agent, wherein the common software image does not contain the remote application.

20. The computer system of claim 15, wherein the application package comprises a virtual disk file that includes installed content of the remote application and metadata attributes of the remote application.

* * * * *